United States Patent
Tandler et al.

(10) Patent No.: US 7,640,742 B2
(45) Date of Patent: Jan. 5, 2010

(54) DEVICE FOR MONITORING THE LEVEL OF A CONTAINER

(75) Inventors: Peter Tandler, Kronberg (DE); Stefan Günther, Gründau-Lieblos (DE); Thomas Jebousek, Dvur Kralove (CZ); Jörg Walter, Taunusstein (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 273 days.

(21) Appl. No.: 10/593,999

(22) PCT Filed: Mar. 18, 2005

(86) PCT No.: PCT/EP2005/051270

§ 371 (c)(1),
(2), (4) Date: Jun. 12, 2007

(87) PCT Pub. No.: WO2005/093772

PCT Pub. Date: Oct. 6, 2005

(65) Prior Publication Data

US 2007/0283754 A1 Dec. 13, 2007

(30) Foreign Application Priority Data

Mar. 26, 2004 (DE) .................. 10 2004 015 486
Dec. 21, 2004 (DE) .................. 10 2004 061 357

(51) Int. Cl.
*B60T 17/22* (2006.01)
*B60T 11/26* (2006.01)
(52) U.S. Cl. ........................................ 60/534; 60/585
(58) Field of Classification Search .............. 60/534, 60/585; 73/308, 322.5
See application file for complete search history.

(56) References Cited

U.S. PATENT DOCUMENTS

| 450,856 | A | * | 4/1891 | Wright ................. 73/322.5 |
| 3,437,771 | A | | 4/1969 | Nusbaum |
| 3,555,905 | A | * | 1/1971 | George ................. 73/322.5 |
| 3,603,925 | A | | 9/1971 | Hughes et al. |
| 4,020,481 | A | | 4/1977 | Nakagawa |
| 4,841,107 | A | * | 6/1989 | Tandler et al. ........... 73/322.5 |
| 6,230,561 | B1 | * | 5/2001 | Li ...................... 73/322.5 |

FOREIGN PATENT DOCUMENTS

DE 37 16 135 A1 11/1988
WO WO 93/03343 2/1993

* cited by examiner

*Primary Examiner*—Michael Leslie
(74) *Attorney, Agent, or Firm*—RatnerPrestia

(57) ABSTRACT

A device for monitoring the level of a supply reservoir, in particular of a hydraulic motor vehicle brake system, comprising a float that has a magnet for actuating a switch or a sensor. The float has a multipart design comprising a first part and a second float part and the magnet is encased and arranged between the two float parts.

10 Claims, 3 Drawing Sheets

DEVICE FOR MONITORING THE LEVEL OF A CONTAINER

This application is the U.S. national phase application of PCT International No. PCT/EP2005/051270, filed Mar. 18, 2005, which claims priority to German Patent Application No. DE 10 2004 015 486.4, filed Mar. 26, 2004 and German Patent Application No. DE 10 2004 061 357.5, filed Dec. 21, 2004.

BACKGROUND OF THE INVENTION

1. Technical Field

The present invention relates to a device for monitoring the fluid level of a supply reservoir, in particular of a hydraulic motor vehicle brake system, comprising a float that has a magnet for actuating a switch or a sensor.

2. Description of Related Art

In a hydraulic motor vehicle brake system, the brake fluid required is contained in the supply reservoir, and the fluid level is monitored by the magnet that is used to activate the switching contacts. When the level of the brake fluid drops, the switching contacts are activated. This signal is evaluated in an electronic control unit, and the driver of the motor vehicle can be warned by a lamp, or a similar device. As this occurs, it must be ensured that the supply reservoir is always filled with a minimum of brake fluid in order not to jeopardize the operation of the brake system. Normally, devices for monitoring the level of a fluid reservoir are used, in which the float operates a Reed contact as soon as the float adopts a predetermined position (operating point) when the fluid level in the reservoir falls below a defined minimum. Operation of the Reed contact triggers a warning signal that is noticeable to the driver, whereupon the driver must take appropriate countermeasures.

DE 37 16 135 A1 e.g. discloses a device of this type. This device includes a float with a magnet, which latter has an annular design and is shifted by way of a radial cutout in the float into its installation position around a central bore of the float. Sidewalls of the cutout include mounting means that secure the magnet in its installation position.

It is considered disadvantageous that the magnet can rupture and get detached from the float when it is damaged due to manufacture or during the assembly. The float will be stuck thereby, causing failure of the device.

SUMMARY OF THE INVENTION

In view of the above, an object of the invention is to provide an improved device for monitoring the fluid level of a supply reservoir.

According to the invention, this object is achieved in that the float has a multipart design comprising a first float part and a second float part, and the magnet is encased and arranged between the two float parts. Thus, parts of a ruptured magnet are prevented from becoming detached from the float, and there is no risk that the float might be stuck.

The encasing of the magnet can simply be achieved in that the magnet, after joining of the two float parts, is arranged in annular recesses of the first and second float parts in an encapsulated fashion.

Preferably, the first float part and the second float part are adapted to be locked with each other by means of lock elements, whereby the connection of the two float parts can be established without tools.

Another favorable embodiment of the invention provides that the first float part has a stepped through-bore into which the second float part can be mounted by means of a press fit. The two float parts hence have a simple shape, which lends itself to ease of manufacture. Preferably, the magnet is arranged in an annular recess of the second float part, which is covered by a step of the first float part after the two float parts have been assembled.

In another favorable embodiment of the invention, the first float part can be slipped into the second float part, and the magnet is arranged in an annular recess on a top side of the second float part, which is covered by a bottom side of the first float part after the two float parts have been fitted. This renders simple joining of the two float parts possible without the use of tools.

Preferably, the second float part has a radial recess into which the first float part can be slipped, and projections are provided at sidewalls of the first float part which allow slipping the first float part in a guided manner into the radial recess of the second float part.

In order to hold the two float parts together safely, means are provided at the first and second float parts, which ensure a safe connection of both float parts. To this end, the first float part at the bottom side favorably includes a projection, which snaps into a recess on the top side of the second float part after the two float parts have been joined. Thus, the float can be made as a prefabricated subassembly, without the risk of the single parts becoming detached during transport.

A simple and cost-efficient manufacturability of the float is achieved in that the two float parts are configured as a foamed plastic part.

BRIEF DESCRIPTION OF THE DRAWINGS

The invention will be explained in the following by way of the drawings showing embodiments. In a highly schematic way and partly in cross-section in the drawings.

DETAILED DESCRIPTION OF THE PREFERRED EMBODIMENTS

Figure 1:
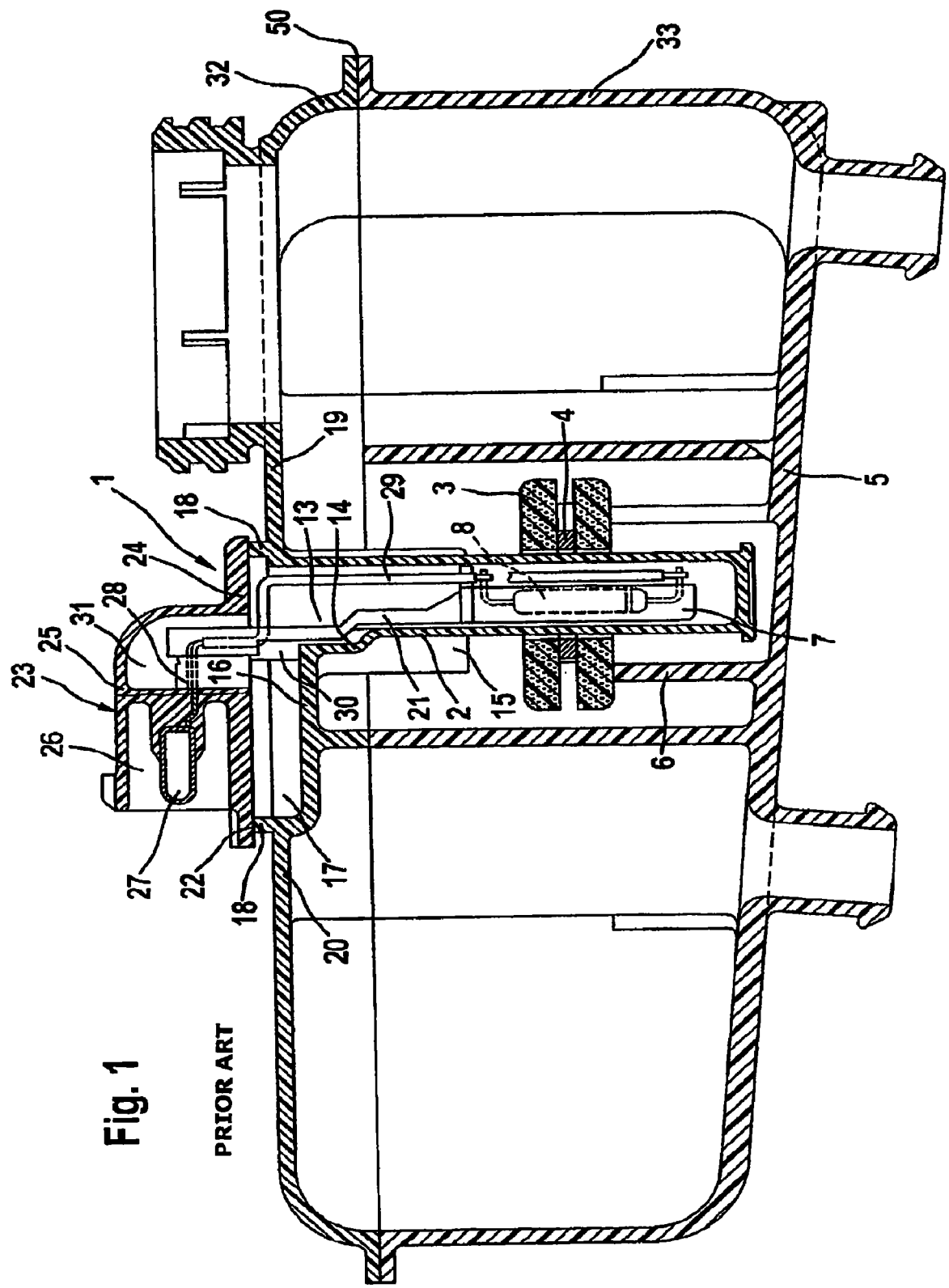
FIG. 1 is a longitudinal cross-sectional view of a supply reservoir with a prior art device for monitoring the fluid level of a reservoir.

FIG. 1 shows a supply reservoir 1 for a hydraulic fluid, preferably brake fluid, with a prior art device for monitoring the fluid level of a reservoir according to DE 37 16 135 A1. The supply reservoir 1 is e.g. attached to a master cylinder (not shown) of a vehicle brake system and is connected to a guide tube 2, which projects into its interior and is closed at its end facing the reservoir's interior. Alongside the guide tube 2, which preferably has a circular cross-section, a float 3 is displaceably arranged, which is e.g. configured as a ring. The float 3 carries an annular magnet 4. A tubular socket 6, which projects from the bottom 5 of the supply reservoir 1 and encompasses the guide tube 2 partly concentrically, is provided as a stop for the float 3. This stop defines the bottom-most position of the float 3 in the supply reservoir 1 and prevents the float 3 from leaving the guide tube 2.

A support member 7, at which a Reed switch 8 is attached, is provided in the interior of the guide tube 2. Attached to support member 7 is a lug 21, which extends in parallel to the longitudinal axis of the guide tube 2 and extends into an inside slit 13 of a radial projection 14 of the guide tube 2. The guide tube 2 is furnished with several ribs 15, which are arranged symmetrically offset relative to each other and form the upper stop for the float 3. At its top end, the guide tube 2 passes over into a bottom 16 of a flat cavity 17, the sidewalls 18 of which connect to walls 19 and 20 of the supply reservoir 1. The sidewalls 18 extend beyond the walls 19, 20 of the supply reservoir 1 by a small amount and form with their top edges 22 stop surfaces for a cover 23. Said cover comprises a plane base plate 24, projecting from which is a plug connector housing 25. The plug connector housing 25 includes a recess 26, into which two contact pins 27 or blade contacts of a plug connector extend, which is inserted with one end into the plug connector housing 25 in a gas-tight or fluid-tight fashion. The end 28 of each contact pin 27 that is opposed to the recess 26 connects to the end of an electric line 29. The other ends of the electric lines 29 are connected to the Reed switch 8. These lines 29 can also be arranged in a cable.

Two projections 30, which slightly continue the walls on opposite sides of the slit 13 and e.g. are not higher than the sidewalls 18, extend into the cavity 17. The lug 21 extends into the space between the projections 30. In the plug connector housing 25, a recess 31 is arranged in the part lying above the projections 30, and the end of the lug 21 and, optionally, the projections 30 can protrude into the recess when the cover 23 closes the cavity 17. The supply reservoir 1 is composed of a top part 32 and a bottom part 33 being welded to each other at their edges 50.

The float 3 of the prior art device for monitoring the fluid level of a reservoir is of integral design and includes a radial cutout, into which the annular magnet 4 is slipped. Sidewalls of the cutout are furnished with retaining means securing the magnet 4 in its mounting position.

Figure 2:
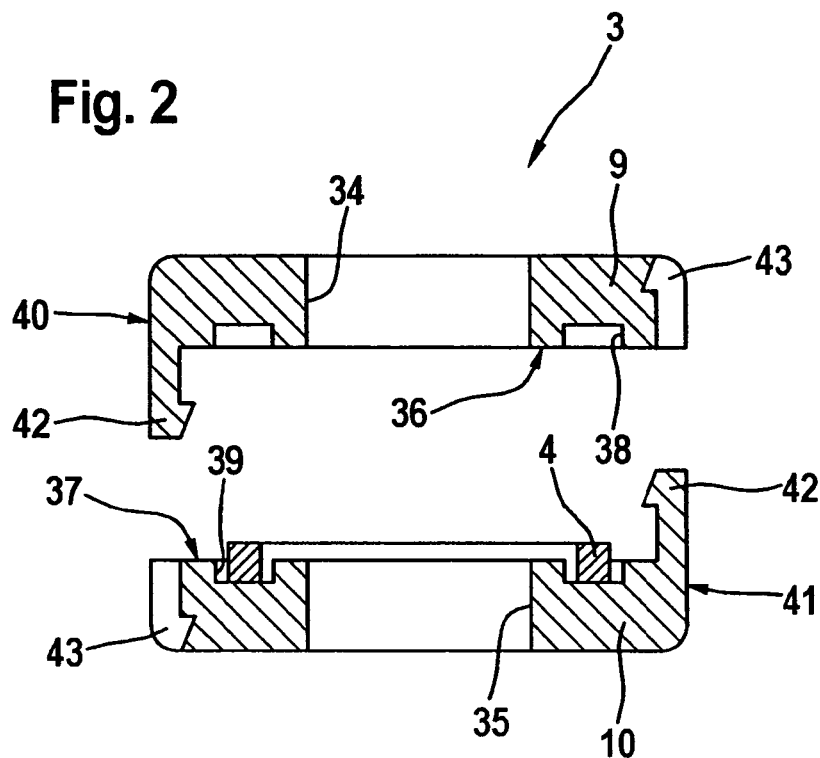
FIG. 2 shows a float of a first embodiment of a device of the invention for detecting the fluid level.

FIG. 2 shows a float 3 of a first embodiment of a device of the invention for detecting the fluid level in a supply reservoir 1. As can be seen in FIG. 2, the float 3 has a first float part 9 and a second float part 10 with respectively one axial central bore 34, 35, and the two float parts 9, 10 are depicted prior to their joining. The central bores 34, 35 serve to guide the float 3 on the guide tube 2.

On an inside surface 36, 37, the two float parts 9, 10 include each one annular recess 38, 39, with the two recesses 38, 39 enclosing a common annular space after the two float parts 9, 10 have been joined. An annular magnet 4 is enclosed in this annular space, i.e. the magnet 4 is so-to-speak encapsulated in the float 3. This casing prevents parts of the magnet 4 from moving into the interior of the supply reservoir 1 in case the magnet 4 is ruptured due to defects of fabrication or during the assembly.

The two float parts 9, 10 include at an outside surface 40, 41 one or more locking elements 42 in the form of locking arms, which move into locking engagement in recesses 43 at the edge 40, 41 when the two float parts 9, 10 are assembled.

Figure 3:
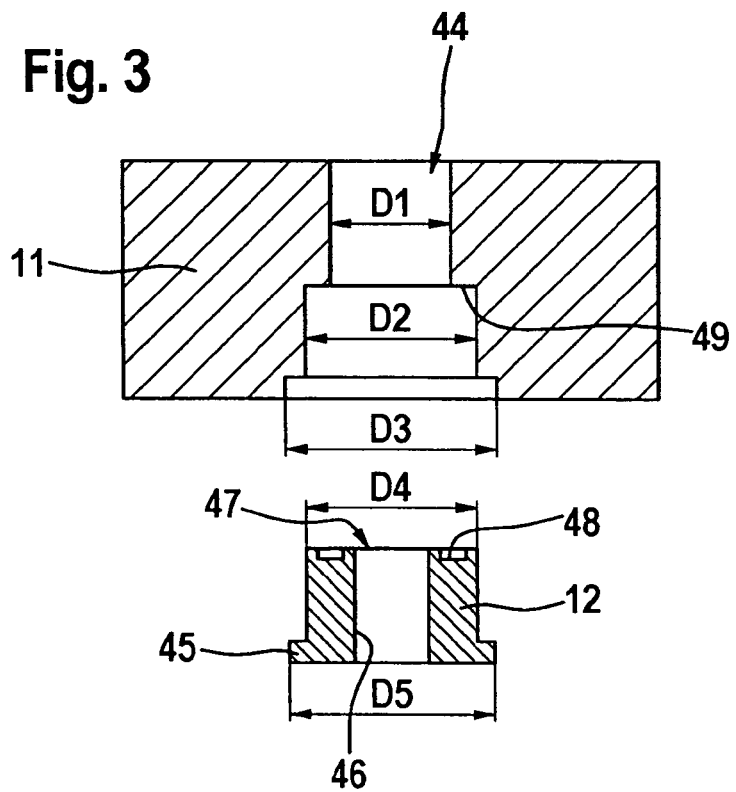
FIG. 3 shows a float of a second embodiment of a device of the invention for detecting the fluid level.

FIG. 3 shows a float 3 in a second embodiment of a device of the invention for detecting the fluid level in a supply reservoir 1.

Figure 4:
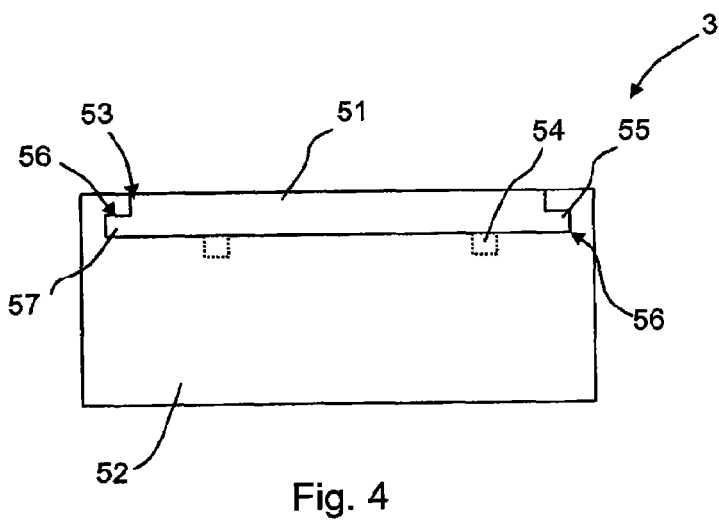
FIGS. 4 and 5 show a float of a third embodiment of a device of the invention for detecting the fluid level in a supply reservoir.
Figure 5:
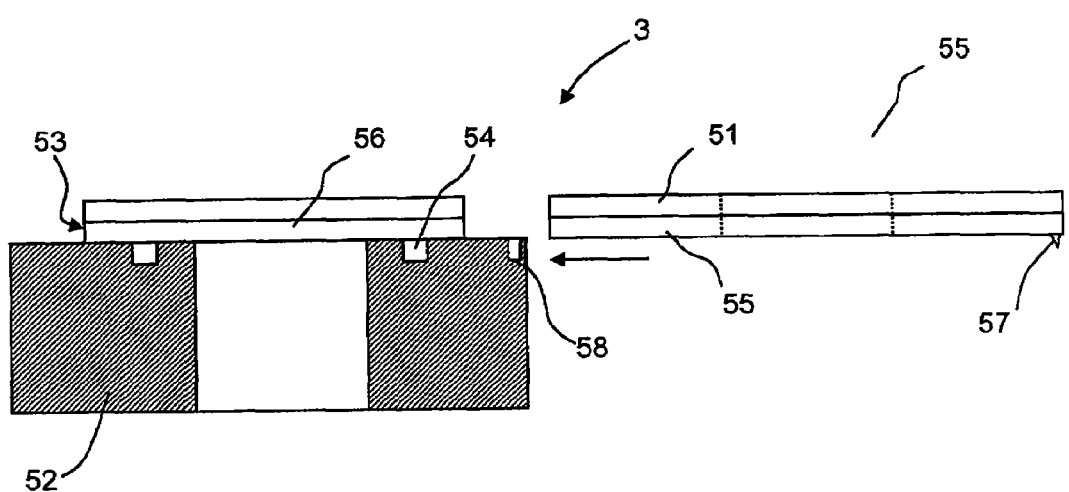

FIGS. 4 and 5 show a float 3 of a third embodiment of a device of the invention for detecting the fluid level in a supply reservoir 1. The float of the present embodiment also includes a first and a second float part 51, 52, respectively, with the first float part 51 being adapted to be slipped into the second float part 52. For this purpose, the second float part 52 has a radial recess 53, into which the first float part 51 can be slipped in a guide manner. For guiding purposes, the sidewalls of the first float paart 51 include projections 55, while mating recesses 56 are provided at the sidewalls of the second float part 52.

Like the float of the first embodiment according to FIG. 2, the float 3 of the second embodiment is also of two-part design comprising a first float part 11 and a second float part 12.

The first float part 11 has a stepped axial central through-bore 44 with three different diameters D1, D2, D3, and D1 represents the smallest diameter, D2 the intermediate and D3 the largest diameter. The second float part 12 is essentially cylindrical with a circumferential collar 45 and also includes an axial central bore 46. The outside diameter D4 of the second float part 12 is so designed that it establishes a press fit with the intermediate diameter D2 of the stepped through-bore 44. Collar 45 has an outside diameter D5 that is slightly smaller than the largest diameter D3 of the through-bore 44. It is likewise feasible that the collar 45 of the second float part 12 is so configured that it can be clipped into a corresponding undercut in the first float part 11 in order to interconnect the two components.

To accommodate an annular magnet 4, an annular recess 48 is arranged at a top surface 47 of the second float part 12. When the two float parts 11, 12 are assembled, the top surface 47 bears against a step 49 of the through-bore 44, which is designed between the smallest diameter D1 and the intermediate diameter D2. The magnet is enclosed in the annular recess 48 due to this abutment, that means, it is encased therein. The recess 48 can be covered completely or only partly by the step 49.

A third, non-illustrated embodiment of a device of the invention for detecting the fluid level in a supply reservoir 1 provides a float with a first and a second float part, with the first float part being adapted to be slipped into the second float part. For this purpose, the second float part has a radial recess, into which the first float part can be slipped in a guided manner. For guiding purposes, the sidewalls of the first float part include projections, while mating recesses are provided at the sidewalls of the second float part.

In this arrangement, the magnet can be arranged in an annular recess 54 on a top side of the second float part 52, which is covered by a bottom side of the first float part 51 after the two float parts 51, 52 have been assembled.

In order that the two float parts 51, 52 are joined reliably, the first float 51 part may have a projection 57 at the bottom side, which snaps into a recess 58 on the top side of the second float part 52 after the assembly of the two float parts 51, 52.

The invention claimed is:

1. A device for monitoring the fluid level of a supply reservoir comprising:
    a float including a magnet for actuating a switch or a sensor, wherein the float has a multipart design comprising a first float part and a second float part, wherein the second float part has an upper surface with an annular recess defined in the upper surface, the annular recess configured to receive and support the magnet and the first float part is configured to cover the recess such that the magnet is encased between the two float parts.

2. The device as claimed in claim 1, wherein the first float part and the second float part are adapted to be locked with each other by lock elements.

3. The device as claimed in claim 1, wherein the first float part has a stepped through-bore into which the second float part is mounted by means of a press fit.

4. The device as claimed in claim 3, wherein the magnet is arranged in the annular recess of the second float part, which is covered by a step of the first float part after the two float parts have been fitted together.

5. The device as claimed in claim 1, wherein the first float part can be slipped into the second float part, and the magnet is covered by a bottom side of the first float part after the two float parts have been fitted.

6. The device as claimed in claim 1, wherein the second float part has a radial recess into which the first float part can be slipped, and projections are provided at sidewalls of the first float part which allow slipping the first float part in a guided manner into the radial recess of the second float part.

7. The device as claimed in claim 1, wherein the first float part at a bottom side thereof includes a projection which snaps into a recess on a top side of the second float part after the two float parts have been fitted.

8. The device as claimed in claim 1, wherein the first float part and the second float part are configured as a foamed plastic part.

9. The device as claimed in claim 1, wherein the supply reservoir is part of a hydraulic motor vehicle brake system.

10. The device as claimed in claim 1, wherein the first float part includes a lower surface with an annular recess defined in the lower surface, wherein in an assembled form of the device the annular recess of the first float part and the annular recess of the second float part define a common annular space that is sized to encase the magnet.

* * * * *